May 29, 1928.                                                    1,671,781
G. P. PHILLIPS
ARTIFICIAL TOOTH
Filed Feb. 26, 1925

Inventor:
George P. Phillips,
by Emery Booth Janney Varney
Attys.

Patented May 29, 1928.

1,671,781

UNITED STATES PATENT OFFICE.

GEORGE P. PHILLIPS, OF BOSTON, MASSACHUSETTS.

ARTIFICIAL TOOTH.

Application filed February 26, 1925. Serial No. 11,701.

This invention relates to artificial teeth and more particularly to those intended to be used in bridge work or for purposes where it is desired to utilize a simple, structurally strong and efficient attachment for an artificial tooth or teeth.

The invention will be best understood by reference to the following description when taken in connection with the accompanying illustration of one specific embodiment thereof, while its scope will be more particularly pointed out in the appended claims.

In the drawings:—

Figure 1:
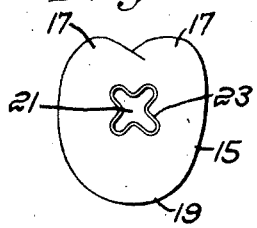
Fig. 1 represents a porcelain tooth of posterior type constructed in accordance with one form of the invention.
Figure 2:
Fig. 2 shows a tubular core member utilized in forming the tooth shown in Fig. 1.
Figure 3:
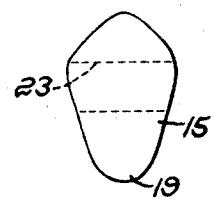
Fig. 3 is a front elevation of the tooth shown in Fig. 1.
Figure 4:
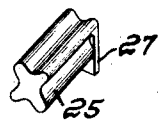
Figs. 4 and 5 are views in perspective of the fastening pins or attachments for opposite sides of the tooth.
Figure 5:
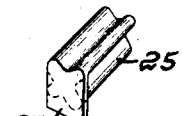

Referring to the drawings and to the embodiment of my invention therein shown for the purpose of illustration, I have taken for illustration the crown portion of a posterior tooth 15 of typical shape utilized in bridge work, but it will be understood that the invention is applicable to any tooth of any shape or formation. The tooth is formed with a porcelain occlusal surface having the cusps 17 and with the porcelain cervical portion 19, the entire contour of the tooth being determined by its porcelain body which preferably presents, except for certain areas of metallic support at its mesial and distal faces, a substantially all-porcelain tooth.

In forming this tooth it is preferably provided with a horizontal passage 21 running entirely through the tooth from side to side and preferably located in the crown portion between the cervical and occlusal portions thereof.

As a convenient means for forming the passage and imparting increased strength for the purpose to which it is applied, I employ a sheet-metal tubular core member 23 about which the tooth is baked, the core remaining in place and constituting a lining for the passage 21. The tubular member is preferably of some high fusing metal, such as platinum, paladium or other high fusing alloy, so as to withstand the temperature of the baking oven.

The tube is preferably roughened on its outer surface so as to secure increased bond and bearing in the porcelain and may be provided with channels or corrugations preferably symmetrically arranged, as shown, so that the passage through the tooth comprises symmetrically arranged grooves or channels.

Figure 6:
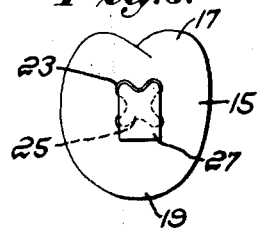
Fig. 6 is a side view of the tooth showing the fastening pin in position with its soldering face placed in one position.
Figure 7:
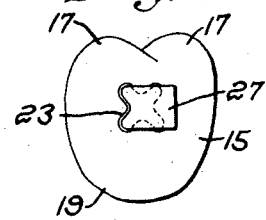
Fig. 7 is a similar view showing the pin placed to present its soldering face at right angles to the position shown in Fig. 5.
Figure 8:
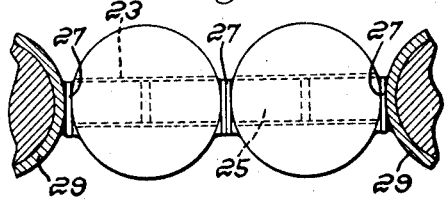
Fig. 8 is a plan view of the porcelain tooth shown in Figs. 1 and 3 illustrating its position in a typical bridge.

In mounting the tooth in a bridge pins or studs 25 are utilized which have a cross-sectional shape conforming to a cross-section of the passage so that they may be inserted from opposite ends thereof, each pin being provided with an attachment plate 27 presenting an external metallic area for attachment to an adjacent abutment. Such plate lies against the side of the tooth when the pin is inserted, as represented in Figs. 6, 7 and 8, the attachment plate 27 presenting an external attachment area or face which is raised above or projects beyond the porcelain surface or contour of the tooth. Each plate is in the form of an ear which is eccentrically mounted on the end of its pin or stud extending laterally from the end of the pin, and the latter may be inserted in the opening or bore of the tooth so that the plate may be directed lengthwise the tooth or toward the cervical part thereof, as in Fig. 6, or at right angles thereto as, for example, toward the lingual side, as illustrated in Fig. 7. This provision for adjusting the plates to different positions, as indicated in Figs. 6 and 7, provides latitude for locating the plates with reference to the depth of the pit between the teeth.

The abuments having been prepared by any of the ordinary methods, the tooth 15 is placed in its assigned position in the bridge by soldering one of the plates 27 to its next adjacent abutment, such, for example, as to the gold crown 29 illustrated in Fig. 8, the solder at the same time being caused to run in between the pin and the tubular lining of the tooth so as to permanently fasten the pin into place. If the bridge is a single tooth bridge, the plate at the opposite side may be similarly fastened to its adjacent abutment, or, if the bridge has a plurality of teeth, it may be fastened in like manner to an adjacent plate similar to the plate 27 presented by the next adjoining tooth of the bridge constructed similarly to the tooth herein described. The application of the invention, as represented in Fig. 8, is merely typical of one embodiment thereof and it may be embodied in bridges of any desired type and employing one or more intermediate artificial teeth, and the type of teeth described may be utilized through its attaching plate in connection with various forms of mountings or supports other than that herein indicated.

Figure 9:
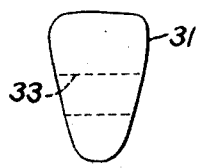
Fig. 9 represents a tooth of anterior form constructed according to one form of my invention.
Figure 10:
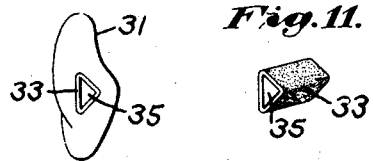
Fig. 10 is a side elevation of the tooth shown in Fig. 9.
Figure 11:
Fig. 11 illustrates a tubular core of modified form used in the tooth shown in Figs. 9 and 10.
Figure 12:
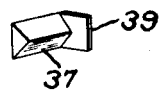
Fig. 12 shows the form of pin employed with the core illustrated in Fig. 11.
Figure 13:
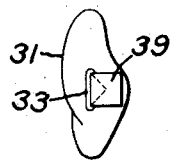
Fig. 13 illustrates the pin in position for fastening the anterior tooth in place.

In Figs. 9 and 10 I have illustrated a tooth 31 constructed on similar principles but of anterior form and provided with a tubular core or lining 33 forming an opening 35 of triangular cross section extending through the tooth from its mesial to its distal face. This tooth is provided with attachment pins 37, of which one only is shown. These have each the attachment plate 39, the pins being adapted to be inserted and soldered in the opening 35 from opposite faces of the tooth, the latter thereby presenting attachment plates at the opposite mesial and distal faces thereof, as illustrated in Fig. 13, where the attachment plate extends toward the lingual side of the tooth only. The method of mounting the tooth in the bridge may be similar to that described in connection with the posterior form of tooth.

Since the metallic areas of attachment are located well away from the cervical portion of the tooth and away from the point of its contact with the stationary soft tissues of the mouth, the porcelain portion of the tooth only contacts therewith and the latter may be ground to give any desired bearing or contact with the gum. It is well known that porcelain has marked advantages over gold or other metal in that it does not accumulate a film about its surface as does a metallic contact. The occlusal surface of the tooth as well as the tissue contacting surface being porcelain, a superior grinding surface can be provided since the porcelain can be ground down accurately to correspond to the grinding surface of the opposing teeth. The metallic supporting plates are so located that they are not visible from the buccal or outer face of the tooth, and the latter presents the superior appearance of an all porcelain tooth.

For the purpose of interchangeability or replacement these teeth may be made in a variety of standard sizes for the different molars, bicuspids, etc., so that when through breakage it becomes necessary to replace one of the artifical teeth of the bridge, it is necessary only to supply a similar tooth of the same standardized form and shape.

While I have herein shown for the purpose of illustration one specific embodiment of the invention, it is to be understood that extensive deviations may be made and various applications thereof other than those herein illustrated may be availed of, all without departing from the spirit of the invention.

I claim:

1. A bridge tooth having a porcelain crown, recesses in opposite mesial and distal faces thereof, a metallic stud adapted to be inserted and secured in each recess, said studs presenting each an external metallic ear eccentrically arranged with relation to the stud, the stud being adjustable in the recess to cause the ear to project either laterally or longitudinally with relation to the length of the tooth.

2. An artifical bridge tooth comprising a porcelain crown, the latter having a transversely arranged tubular metallic core provided with symmetrically arranged grooves, and a pin fitting the tubular core and having at its end an external metallic ear by which the tooth may be fastened to an adjacent abutment.

3. An artificial bridge tooth comprising a porcelain crown having a transversely arranged metallic tubular core, and a pin adapted to be inserted in the tubular core and presenting an external plate having an external attachment area, the walls of the core and pin being interrelated to permit the pin to be rotatably fixed in said core in any one of a plurality of positions.

4. An artificial bridge tooth comprising a porcelain crown, the latter having a transversely arranged metallic tubular core, a metallic stud adapted to be inserted in the tubular core and having at its end a plate eccentrically arranged with relation to the stud, the walls of the core and the stud being interrelated to permit the latter to be rotatably fixed in said core in any one of a plurality of positions and to cause the plate to project either laterally or longitudinally with relation to the length of the tooth.

5. An artificial bridge tooth comprising a porcelain crown, the latter having a transversely arranged metallic tubular core, a metallic stud fitting the core and adapted to be inserted therein and retained by its contact with the walls of the core and having as an integral part thereof an external metallic plate, the latter, when said stud is inserted in the core, being of an area and shape adapted to overlie the porcelain surface of the crown and to present an attachment area projecting beyond the contour of said crown.

In testimony whereof, I have signed my name to this specification.

GEORGE P. PHILLIPS.